United States Patent
Kajihara

[11] Patent Number: 5,210,792
[45] Date of Patent: May 11, 1993

[54] EAR-HANG TYPE HEADSET

[75] Inventor: Kazuhiko Kajihara, Yokohama, Japan

[73] Assignee: Matsushita Electric Industrial Co., Ltd., Osaka, Japan

[21] Appl. No.: 736,776

[22] Filed: Jul. 29, 1991

[30] Foreign Application Priority Data

Aug. 13, 1990 [JP] Japan .................................. 2-214505
Apr. 4, 1991 [JP] Japan .................................. 3-071507
May 17, 1991 [JP] Japan .................................. 3-112802

[51] Int. Cl.⁵ ............................................. H04M 1/05
[52] U.S. Cl. ..................................... 379/430; 381/187
[58] Field of Search ................... 379/430, 428, 431; 381/68.5, 68.7, 69, 183, 187

[56] References Cited

U.S. PATENT DOCUMENTS

| | | | |
|---|---|---|---|
| 2,424,935 | 7/1947 | Kimmel | 381/68.5 |
| 3,084,229 | 4/1963 | Selsted | 381/187 |
| 4,073,366 | 2/1978 | Estes | 381/68.7 |
| 4,893,344 | 1/1990 | Tragardh et al. | 381/187 |
| 4,917,504 | 4/1990 | Scott et al. | 381/187 |

FOREIGN PATENT DOCUMENTS 62-137951  6/1987  Japan .

Primary Examiner—James L. Dwyer
Assistant Examiner—Jack Chiang
Attorney, Agent, or Firm—Stevens, Davis, Miller & Mosher

[57] ABSTRACT

An ear-hang type headset includes a microphone is attached at the forward end of a microphone arm, and a microphone arm base which is connected with the other end of the microphone arm. An ear hanger formed in a shape conformable to the outer periphery of the pinna and an earphone formed in a shape receivable in the concha and having a receiver unit are connected with the microphone arm base. The ear hanger and the earphone are made to be rotatable with respect to the microphone arm base so that the earphone and the ear hanger are to be set to the concha and the outer periphery of the pinna, respectively. It is therefore possible to set the device on both right and left ears by rotating the ear hanger and the earphone with respect to the microphone arm base as well as to cope with the differences among individuals in ear shape and the like.

7 Claims, 8 Drawing Sheets

FIG. I
PRIOR ART
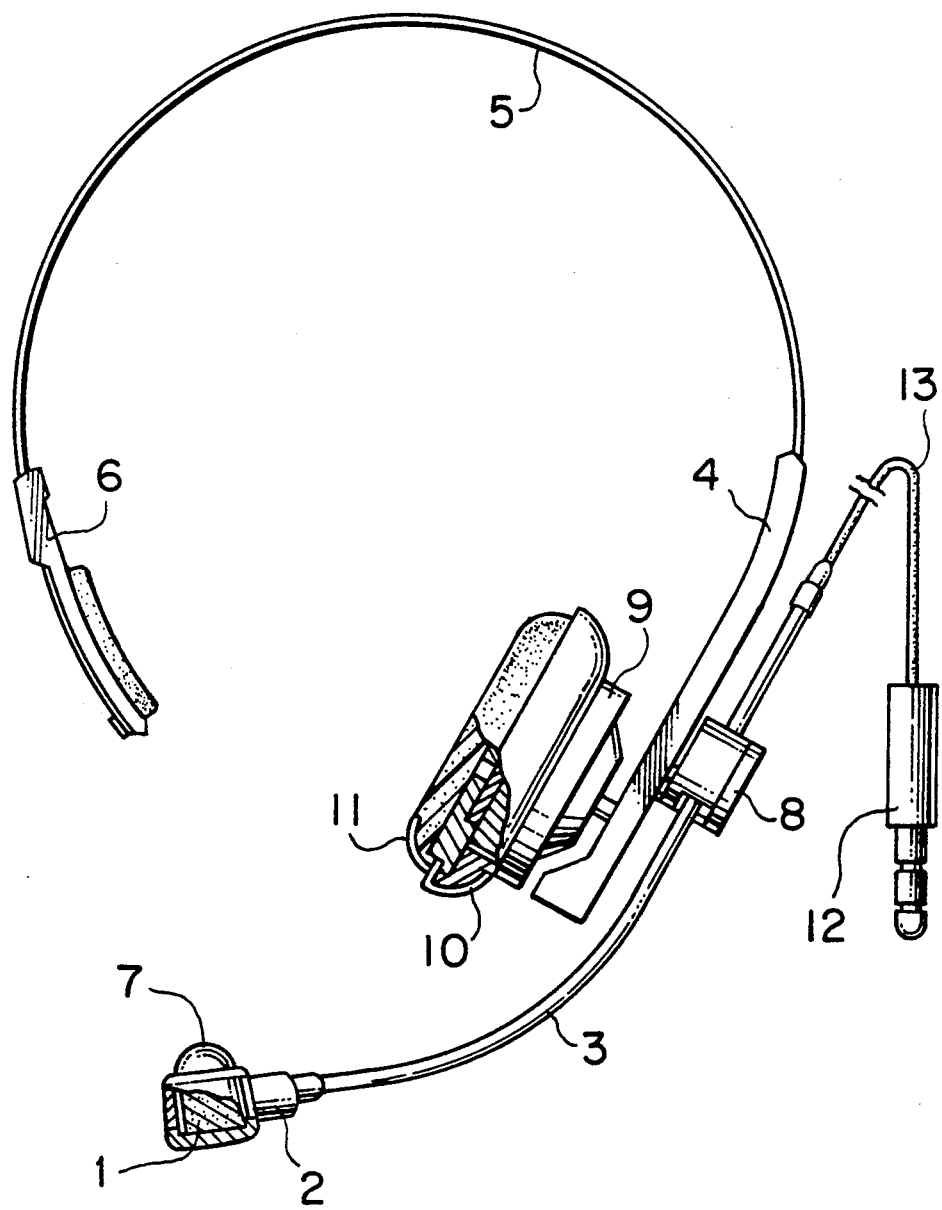

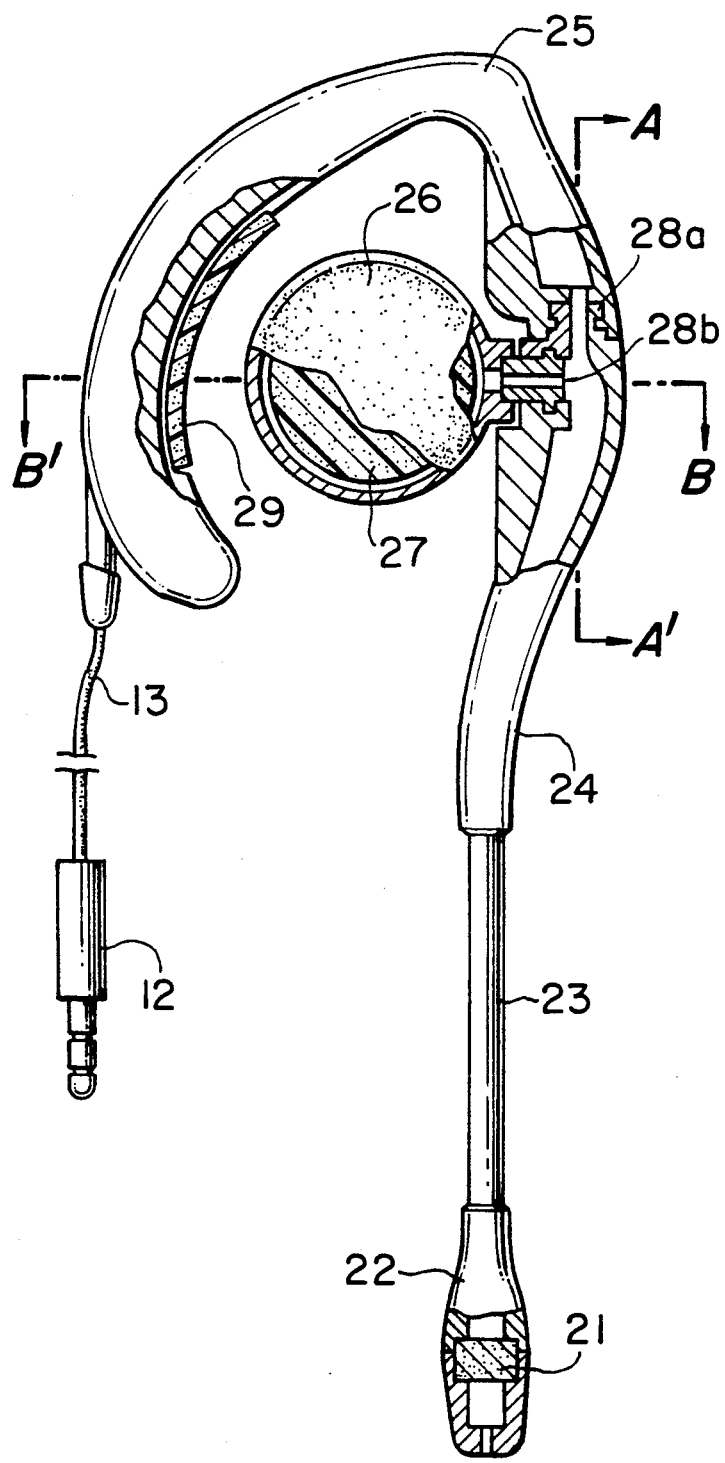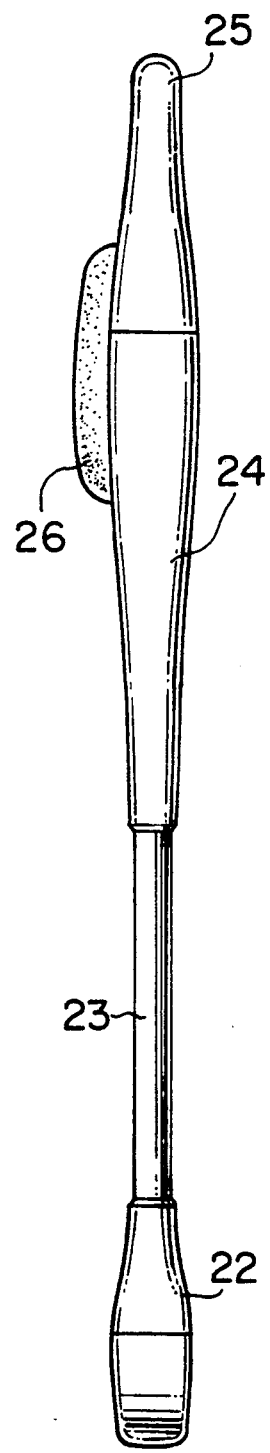
FIG. 2a
FIG. 2b

FIG. 3
FIG. 4
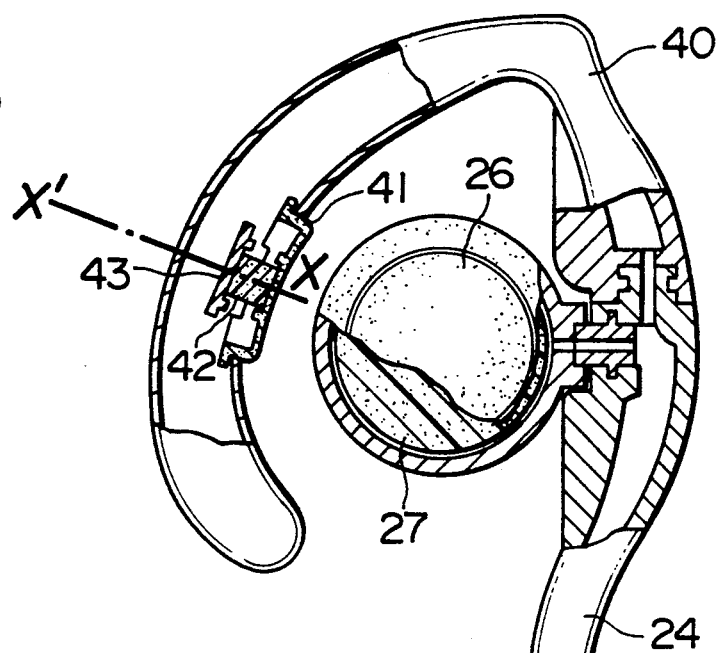
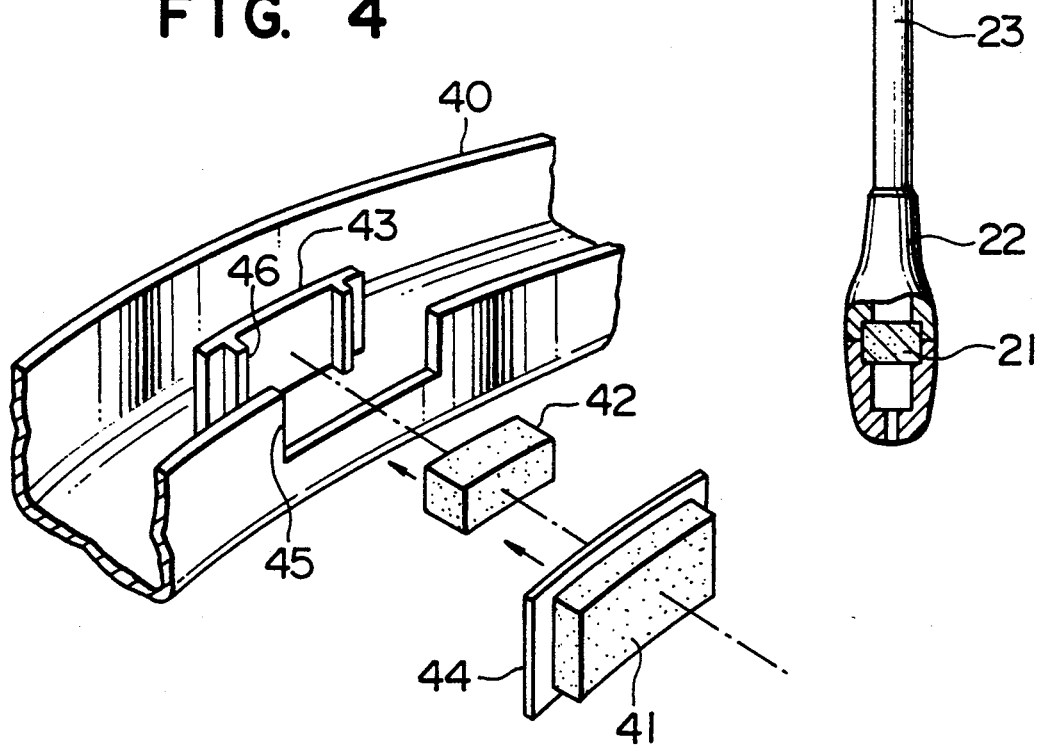

EAR-HANG TYPE HEADSET

BACKGROUND OF THE INVENTION

1. Field of the Invention

The present invention relates to an ear-hang type headset applicable to a communication terminal, a man-machine interface and the like.

2. Description of the Prior Art

FIG. 1 is a front view of a conventional headset with parts thereof being cut away. Conventionally, this kind of headset comprises an earphone 9 having a receiver unit 10 and an ear pad 11, a microphone case 2 having a microphone 1 and a pop filter 7, a head band 5 having a head pad 6 at one end thereof, a microphone arm rotation mechanism 8 serving to hold and rotate a microphone arm 3 at one end of which the microphone case 2 is provided, an attachment base 4 by means of which the head band 5, the earphone 9 and the microphone arm rotation mechanism 8 are combined, and a plug 12 connected with the other end of the microphone arm 3 through a cable 13, as shown in FIG. 1.

When it is intended to use the above-described conventional headset, it is customary that the earphone 9 is put to the user's pinna and the head band 5 is stretched against its biasing force so as to be put on the user's head, so that the earphone 9 can be held by being pressed against the pinna due to the bending force of the head band 5. Further, since the rotation mechanism 8 is capable of holding the microphone arm 3 in any desired position as well as rotating the microphone arm 3 with respect to the attachment base 4, it is possible to set the microphone case 2 in best position near the user's lips.

However, since the above-described conventional headset has the head band 5, the user's hair is pressed and hair style is disheveled at the time of setting and removing the headset, resulting in a serious problem particularly for those who pay careful attention to hair style.

SUMMARY OF THE INVENTION

A first invention is aimed at solving the above-described problem of the prior art and an object thereof is to provide an excellent ear-hang type headset which can be used without pressing hair and disheveling hair style at the time of setting and removal.

To achieve this end, according to the first invention there is provided an air-hang type headset which comprises a microphone case having a microphone, a microphone arm having the microphone case disposed at the forward end thereof, an ear hanger formed in a shape that is conformable to the outer periphery of the pinna, an earphone having a receiver unit and formed in a shape that is receivable in the concha, a microphone arm base connected to the other end of the microphone arm, a rotation mechanism serving to make the ear hanger and earphone rotatable with respect to the microphone arm base, a rear ear pad fitted on a portion of the ear hanger clipping the pinna, and an ear pad stuck to the front surface of the receiver unit of the earphone.

In accordance with the first invention of the above construction, since the pinna is clipped by the ear hanger and the earphone, it is possible to hold the headset without using any head band.

However, the first invention has the problem that since the size of the gap between the ear hanger and the earphone by which the pinna is clipped is fixed, it is impossible to cope with the change of best size of the gap attributable to differences among individuals in pinna shape.

A second invention is aimed at solving the problem of the first invention and an object thereof is to provide an ear-hang type headset which is capable of changing the size of the gap in correspondence to the differences among individuals in pinna shape so as to realize an excellent feeling when it is set.

To this end, according to the second invention there is provided an ear-hang type headset in which a projection is provided in an ear hanger with its height being variable in response to the pinna shape so as to keep the best size of gap for everyone at all times.

With such construction, the pinna can be clipped by the ear hanger and the earphone at all times so that it is possible to maintain the stable holding force.

Further, the first and second inventions have the problem that since the ear pad serves only to prevent dropping from the pinna and improve the touch against the inner peripheral surface of the pinna, the ear pad stuck to the earphone is made of a material which transmits sound waves so as to cause the leakage of sound wave through between the earphone and the pinna, thereby reducing the output sound pressure in the frequency range below 1.5 KHz or so.

A third invention is aimed at solving the above problem of the first and second inventions and an object thereof is to provide an ear-hang type headset which is capable of increasing the output sound pressure by reducing leakage so as to improve the reception performance.

To this end, according to the third invention there is provided an ear-hang type headset in which an ear pad to be stuck to an earphone of the ear-hang type headset is made of a material and formed in a shape that can transmit sound waves and reduce the leakage of sound waves.

With such construction, it is possible to reduce the leakage of sound waves and, hence, to realize the improvement of output sound pressure and the widening of band.

BRIEF DESCRIPTION OF THE DRAWINGS

FIG. 1 is a partly cut-away front view of a conventional headset:

FIG. 2a is a partly cut-away front view of an ear-hang type headset according to an embodiment of a first invention;

FIG. 2b is a side view of the headset shown in FIG. 2a;

FIG. 2c is a disassembled perspective view of an earphone of the headset of FIG. 2a;

FIG. 3 is a partly cut-away front view of an ear-hang type headset according to a first embodiment of a second invention;

FIG. 4 is a disassembled perspective view showing essential portions of the ear-hang type headset according to the first embodiment of the second invention;

FIG. 9b is a sectional view of an ear pad shown in FIG. 9a;

FIG. 10 is a graph showing the received output sound pressure characteristic of the earphone of FIG. 9a;

FIG. 11b is a sectional view of an ear pad shown in FIG. 11a.

DESCRIPTION OF THE INVENTION

Figure 2C:
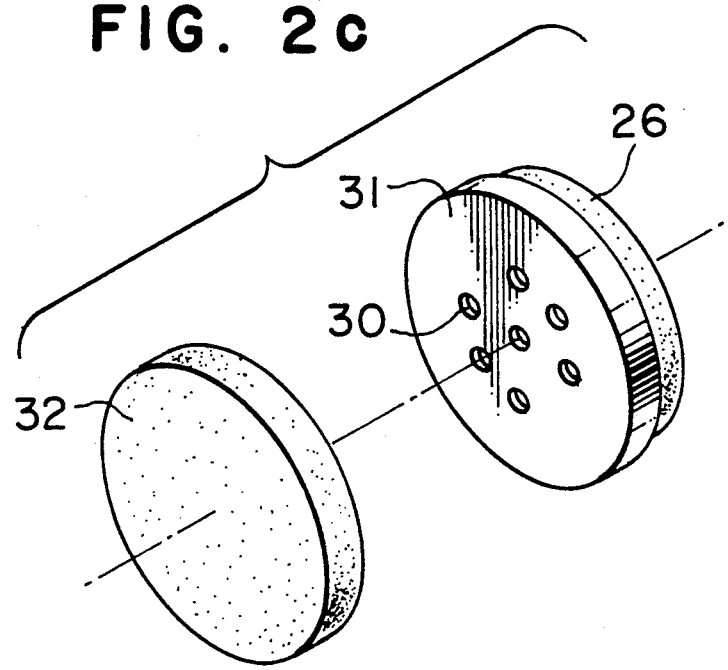

Referring to FIGS. 2a and 2b, reference numeral 21 denotes a microphone encased in a microphone case 22. The microphone case 22 is engaged with the forward end of a microphone arm 23. Reference numeral 24 denotes a microphone arm base fixed to the other end of the microphone arm 23, 27 denotes a receiver unit encased in an earphone 26, 25 denotes an ear hanger, 12 denotes a plug connected with the ear hanger 25 through a cable 13, and 29 denotes a rear ear pad made of rubber foam or the like and fitted inside the ear hanger 25, the rear ear pad 29 serving to cooperate with the earphone 26 to hold the concha therebetween so as to fix the device of this embodiment. The microphone arm base 24 has a rotation mechanism so that the ear hanger 25 and the microphone arm base 24 are engaged through an ear hanger rotation mechanism 28a and the earphone 26 and the microphone arm base 24 are engaged through an earphone rotation mechanism 28b.

Figure 2D:
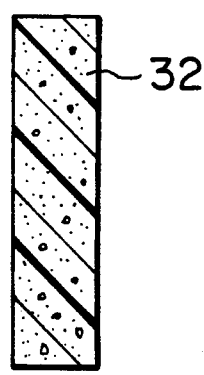
FIG. 2d is a sectional view of an ear pad shown in FIG. 2c.

The inside of the ear hanger 25 is so shaped as to be conformable to the outer periphery of the pinna. Further, the outer periphery of the earphone 26 is so formed as to have a size receivable in the concha. As shown in FIGS. 2c and 2d, the earphone 26 is provided with an ear pad 32 at the front thereof. The ear pad 32 is made of a material which transmits sound waves and has elasticity. The ear pad 32 serves to improve the touch against the inner peripheral surface of the pinna when the earphone 26 is set.

Next, the rotation mechanism of the above embodiment will be described. In the above embodiment, the ear hanger rotation mechanism 28a serves to rotate the ear hanger 25 around a center axis A-A' of the microphone arm base 24 with respect to the microphone arm base, while the earphone rotation mechanism 28b serves to rotate the earphone 26 around the axis B-B' of the earphone 26 perpendicular to the center axis A-A' with respect to the microphone arm base.

As described above, according to the above embodiment, since the ear hanger 25 and the earphone 26 are movable with respect to the microphone arm base 24, the ear hanger 25 and the earphone 26 can be set in their best positions on the outer periphery of the pinna and the concha, respectively. Further, according to the above embodiment, since the headset can be held without using any head band, it is possible to use the headset without pressing hair and disheveling the hair style. Moreover, the headset can be set on both right and left ears because the earphone 26 can be rotated through an angle of 180° by the rotation mechanisms 28a and 28b. In addition, in the above embodiment, the microphone arm 23 may be made of a material which can be bent. When this is the case, the microphone case 22 can be set in the best position near the lips.

FIGS. 3 and 4 illustrate a first embodiment of a second invention. FIG. 3 is a front view of this embodiment and FIG. 4 is a disassembled perspective view showing essential portions of this embodiment.

In FIGS. 3 and 4, members of the same structure and function as those in FIG. 2 are designated by the same reference numerals and, therefore, explanation thereof is omitted.

Referring to FIGS. 3 and 4, an ear hanger 40 is attached with a projection 41 which is slidable in the direction of X-X' in a portion thereof which is to be in contact with the back side or the pinna. An opening 45 through which the projection 41 is passed is formed in the ear hanger 40. The inside surface of the projection 41 is supported by an elastic member 42 made of urethane foam rubber or the like, and the elastic member 42 is combined with a support member 43 formed in the ear hanger 40.

In this embodiment, since the projection 41 is combined with the ear hanger 40 through the elastic member 42, the height of the projection 41 appearing from the ear hanger 40 is variable in accordance with the pressure applied to the front surface of the projection 41. Further, in order to define the range of variation of the height, stoppers 44 and 46 are formed on the projection 41 and the support member 43, respectively. It is known from the results of experiments that upper and lower limits of the range of variation of the height are from 0 to 8 mm. The ear hanger 40 is so set as to be brought into contact with the back side of the pinna, so that the pinna is held in the gap between the ear hanger 40 and the earphone 26. At this time, the height of the projection 41 is changed in accordance with the thickness of the pinna, thereby realizing the most suitable gap size. In consequence, it is possible to absorb differences in headset holding force caused due to differences among individuals in pinna thickness attributable to difference in pinna shapes.

Figure 5:
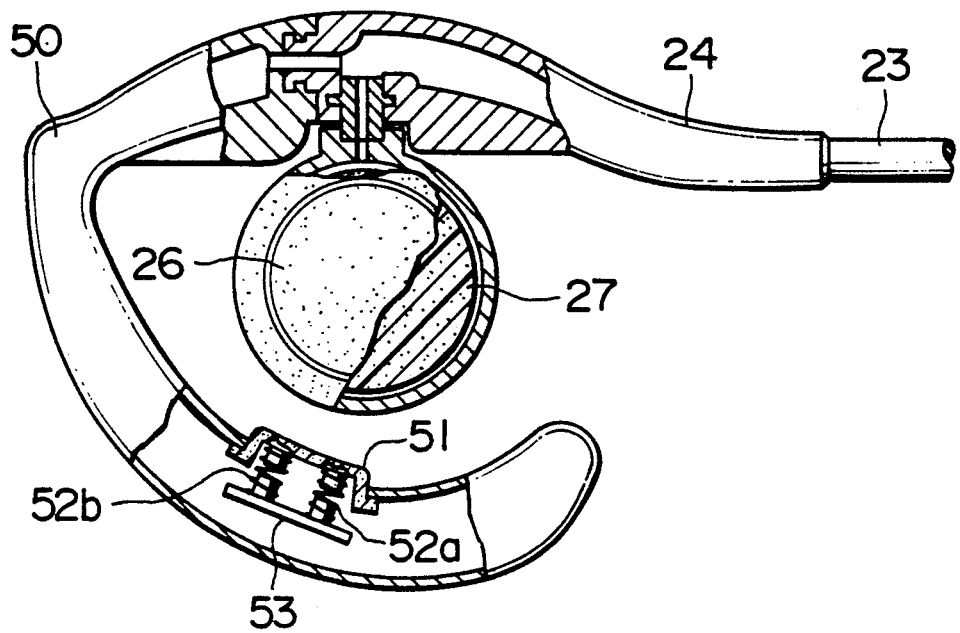
FIG. 5 is a partly cut-away front view of an ear-hang type headset according to a second embodiment of the second invention.
Figure 6:
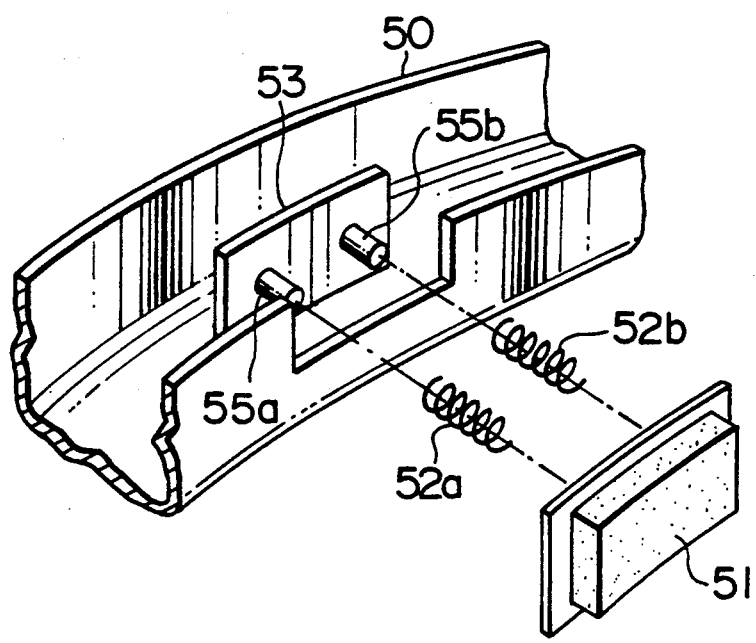
FIG. 6 is a disassembled perspective view showing essential portions of the ear-hang type headset according to the second embodiment of the second invention.

FIGS. 5 and 6 illustrate the structure of a second embodiment of the second invention. In FIG. 5, reference numeral 50 denotes an ear hanger and 51 denotes a projection which moves in the same manner as the projection 41 of the above first embodiment. The inside surface of the projection 51 is supported by coiled springs 52a and 52b, and the coiled springs 52a and 52b are engaged with a support member 53 formed in the ear hanger 50. FIG. 6 shows the details of attaching structure of the projection 51. As shown in FIG. 6, cylindrical protrusions 55a and 55b are formed on the support member 53 so that the coiled springs 52a and 52b are combined with the protrusions 55a and 55b, respectively. The coiled springs 52a and 52b are made of a metal having elasticity, for example.

Next, operation of this embodiment will be described. The manner of changing the height of the projecting portion of the projection 51 is identical with that of the first embodiment. However, an outstanding feature of the present embodiment is that the pressure exerted on the pinna in the state of being held in the gap between the ear hanger 50 and the earphone 26 can be selected in accordance with the spring constant of the coiled springs 52a and 52b. In consequence, it is possible to provide a headset which gives several magnitudes of pressure for the purpose of being adapted to various shapes of pinnas as well as avoiding physical pain at the time of being set. Incidentally, it has been proved from the results of experiments that the selection limit of the pressure ranges from 10 to 200 g/cm².

Figure 7:
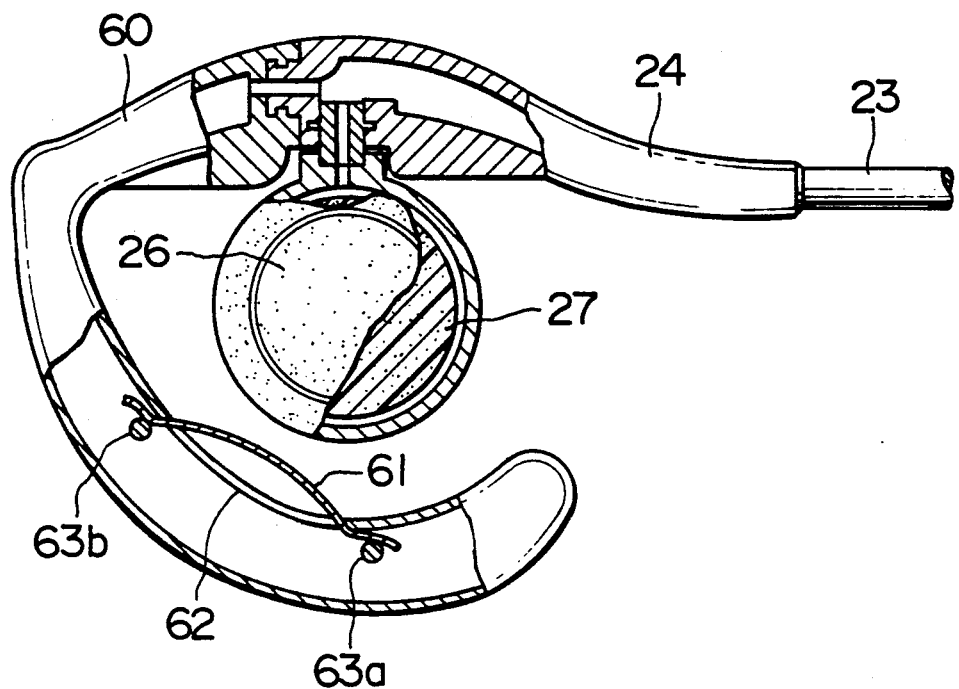
FIG. 7 is a partly cut-away front view of an ear-hang type headset according to a third embodiment or the second invention.
Figure 8:
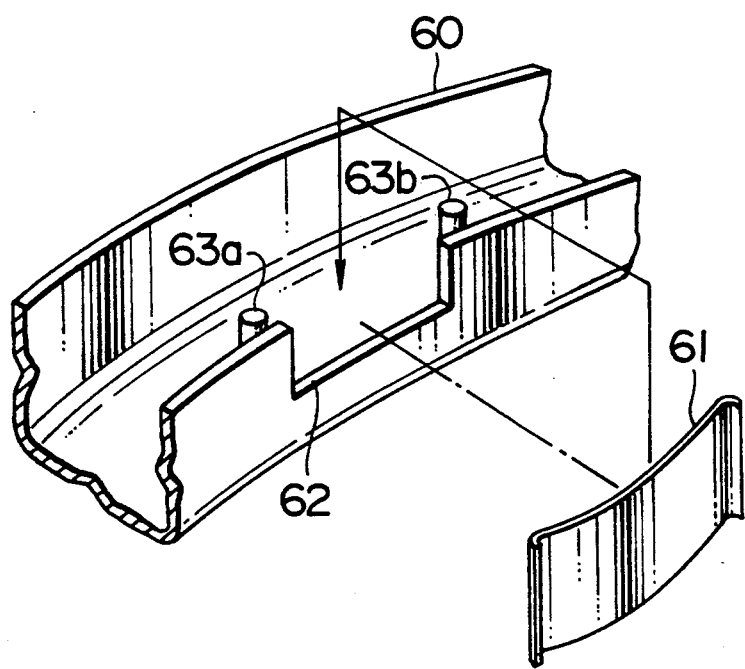
FIG. 8 is a disassembled perspective view showing essential portions of the ear-hang type headset according to the third embodiment of the second invention.

FIGS. 7 and 8 illustrate the structure of a third embodiment of the second invention. In FIG. 7, reference numeral 60 denotes an ear hanger and 61 denotes a projection made of a material having elasticity. FIG. 8 shows the details of attaching structure of the projection 61. Cylindrical pins 63a and 63b are formed in the ear hanger 60 at positions near an opening 62. As shown in FIGS. 7 and 8, the projection 61 is engaged with the pins 63a and 63b.

Next, operation of this embodiment will be described. The manner of changing the height of the projecting portion 61 is identical with that of the first embodiment. However, according to this embodiment, since manufacture is facilitated by simplifying the structure of the means for supporting the projection 61 and since the projection 61 itself is made of an elastic thin plate, the projection 61 has a sufficient degree of freedom in its surface configuration so that it can be deformed in agreement with the shape of the back side of the pinna, thereby making it possible to realize a much better feeling when the headset is set. Further, in order to give a sufficient degree of freedom to the surface configuration, it is preferred to use German silver or phosphor bronze as the material for the projection 61.

Figure 9A:
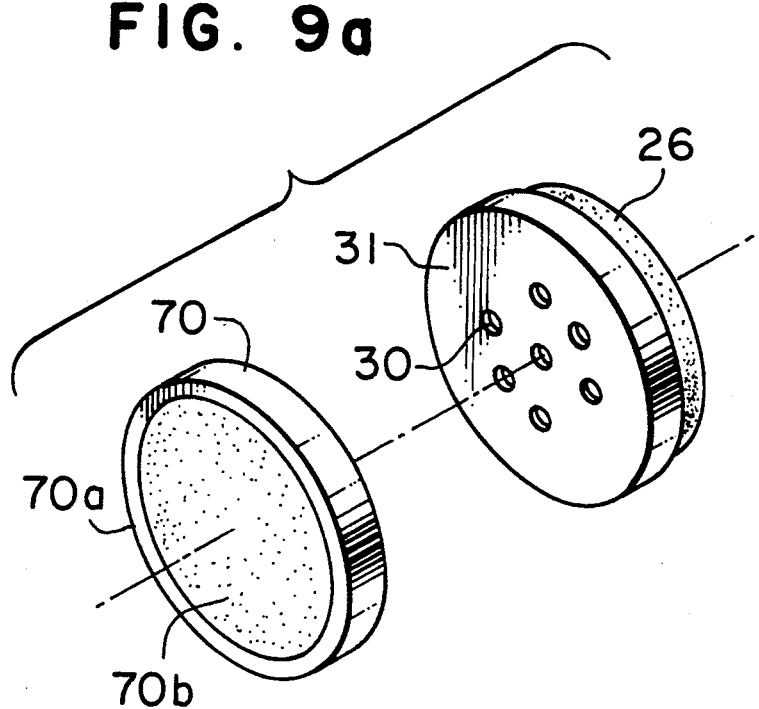
FIG. 9a is a disassembled perspective view of an earphone of an ear-hang type headset according to a first embodiment of a third invention.
Figure 9B:
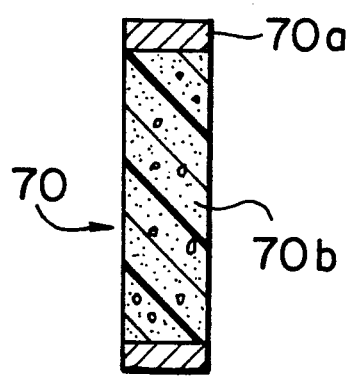

FIGS. 9a and 9b show the structure of a first embodiment of a third invention, and FIG. 9a is a disassembled perspective view of the earphone of an ear-hang type headset of the first embodiment and FIG. 9b is a sectional view of an ear pad thereof.

In FIG. 9a, reference numeral 30 denotes holes formed in an ear phone plate 31 of the earphone 26, and 70 denotes an ear pad stuck to the ear phone plate 31. As seen from FIGS. 9a and 9b, the ear pad 70 is so constructed as to exhibit a low sound transmission coefficient in its outer peripheral portion 70a and a high sound transmission coefficient in its inner portion 70b. In the present embodiment, the ear pad 70 made of urethane foam rubber, for example, is applied with silicon rubber or the like in its outer peripheral portion 70a so as to exhibit a low sound transmission coefficient with its inner portion 70b being used as it is so as to exhibit a high sound transmission coefficient.

Next, operation of this embodiment will be described. The earphone 26 is set on the inner peripheral surface of the pinna through the ear pad 70. Sound waves emitted from the holes 30 of the earphone 26 pass through the portion 70b of high sound transmission coefficient of the ear pad 70 so as to reach the pinna. In this case, if the sound waves leak significantly from the outer periphery of the ear pad 70, the impedance of the acoustic transmission line connecting between the earphone 26 and the pinna is reduced remarkably. On the other hand, since the acoustic impedance on the earphone side is constant, the gain is reduced as the transmission frequency is lowered. However, since application of silicon rubber or the like makes the outer peripheral portion 70a exhibit a low sound transmission coefficient, leakage of sound waves is reduced, thereby lessening the reduction of gain in this portion.

Figure 10:
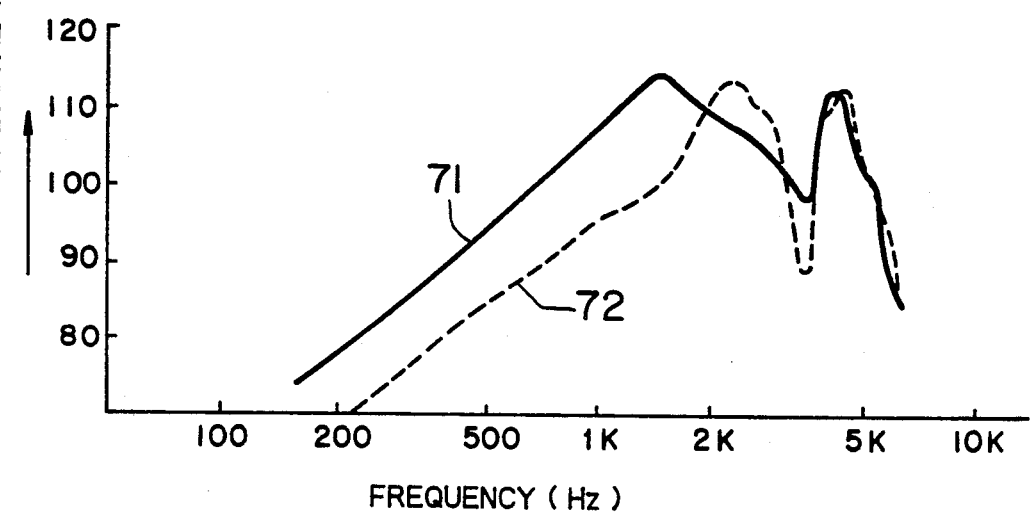

FIG. 10 shows the result of the received output sound pressure characteristic of the ear-hang type headset according to this embodiment when measured at the inlet of the pinna. A full line curve 71 represents the received output sound pressure characteristic obtained in accordance with the present embodiment and a dotted line curve 72 represents the received output sound pressure characteristic obtained in accordance with the prior art.

In consequence, according to the above-described first embodiment, leakage of sound waves can be reduced and, as is apparent from comparison between the curves 71 and 72 of FIG. 10, the output sound pressure can be increased as well as widening of band can be realized.

Figure 11A:
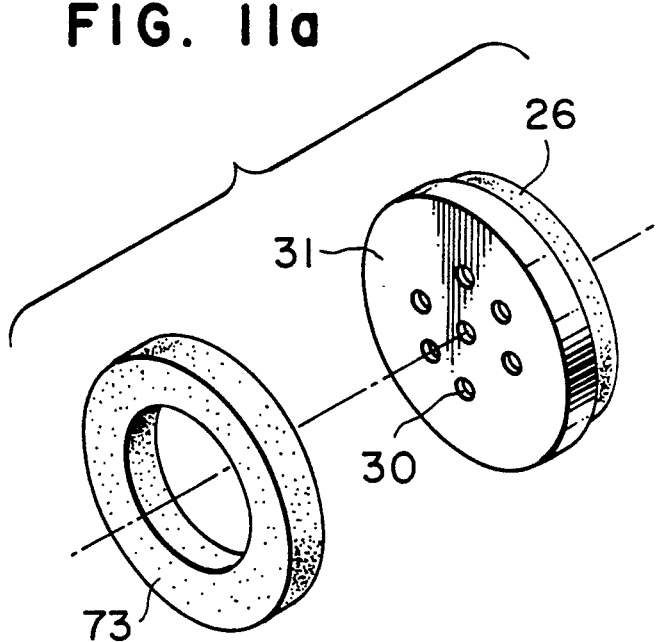
FIG. 11a is a disassembled perspective view of an earphone of an ear-hang type headset according to a second embodiment of the third invention.
Figure 11B:
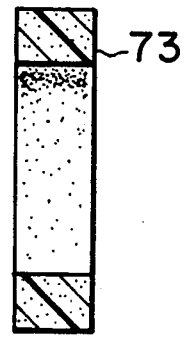

Next, a second embodiment of the third invention will be described with reference to the drawings. FIG. 11a illustrates the structure of the earphone of an ear-hang type headset according to the second embodiment and FIG. 11b shows the section of an ear pad of the second embodiment. In FIG. 11a, reference numeral 73 denotes an ear pad stuck to the ear phone plate 31. The ear pad 73 is formed in the shape of a doughnut as shown in FIGS. 11a and 11b, which has an opening the inside diameter of which is so selected as not to cover the holes 30. The ear pad 73 is made of a material such as silicon rubber, for example, which exhibits a low sound transmission coefficient.

Operation of this embodiment is the same as that of the above-described first embodiment, so that the same effects can be achieved as well.

I claim:

1. An ear-hang type headset comprising:
   (a) a microphone case having a microphone supported therein;
   (b) a microphone arm having a first end and a second end, said microphone case being disposed at said first end;
   (c) an ear hanger formed in a shape engageable with an outer periphery of a pinna of a an ear of a user of the headset;
   (d) an earphone formed in a shape receivable in a concha of the ear of the user and having a receiver unit supported therein;
   (e) a microphone arm base connected to said second end of said microphone arm;
   (f) a first rotation mechanism interconnecting said ear hanger with said microphone arm base to enable said ear hanger to rotate about a first axis with respect to said microphone arm base; and
   (g) a second rotation mechanism interconnecting said earphone with said microphone arm base to enable said earphone to rotate with respect to said microphone arm base about a second axis which is approximately perpendicular to said first axis, whereby said ear hanger and said earphone are adapted to hold the pinna of the ear of the user therebetween.

2. An ear-hang type headset according to claim 1, wherein the earphone can be rotated about said second axis at least for 180° with respect to the microphone arm base by means of the second rotation mechanism so that the headset can be set on both right and left ears.

3. An ear-hang type headset according to claim 1, wherein the microphone arm is made of a material which can be bent.

4. An ear-hang type headset comprising:
   (a) a microphone case having a microphone supported therein;

(b) a microphone arm having a first end and a second end, said microphone case being disposed at said first end;

(c) an ear hanger formed in a shape engageable with an outer periphery of a pinna of an ear of a user of the headset;

(d) an earphone formed in a shape receivable in a concha of the ear of the user and having a receiver unit supported therein;

(e) a microphone arm base connected to said second end of said microphone arm;

(f) a first rotation mechanism interconnecting said ear hanger with said microphone arm base to enable said ear hanger to rotate about a first axis with respect to said microphone arm base;

(g) a second rotation mechanism interconnecting said earphone with said microphone arm base to enable said earphone to rotate with respect to said microphone arm base about a second axis which is approximately perpendicular to said first axis, whereby said ear hanger and said earphone are adapted to hold the pinna of the ear of the user therebetween;

(h) an elastic member disposed in a predetermined portion of said ear hanger; and (i) a projecting member supported through said elastic member at said predetermined portion of said ear hanger so as to project beyond an outer surface of said ear hanger toward the pinna of the ear of the user to a variable extent in accordance with movement of said projecting member in concert with said elastic member in a direction generally orthogonal to said outer surface.

5. An ear-hang type headset according to claim 4, wherein the elastic member is made of urethane foam rubber.

6. An ear-hang type headset according to claim 4, wherein the elastic member is a coiled spring.

7. An ear-hang type headset according to claim 4, wherein the elastic member is a leaf spring.

* * * * *